United States Patent

Ping

[11] Patent Number: 5,640,713
[45] Date of Patent: Jun. 24, 1997

[54] SHOCK ABSORBING FINGER-TIP PROTECTOR

[76] Inventor: D. S. Ping, 3223 Golf View, Saline, Mich. 48176

[21] Appl. No.: 545,200

[22] Filed: Oct. 19, 1995

[51] Int. Cl.$^6$ ............................................. A41D 13/08
[52] U.S. Cl. ............................................. 2/21; 15/227
[58] Field of Search .............................. 2/21, 163, 16, 2/160; 223/101; 294/25; 15/188, 227

[56] References Cited

U.S. PATENT DOCUMENTS

| | | | |
|---|---|---|---|
| 617,929 | 1/1899 | Fowble | 2/21 |
| 718,652 | 1/1903 | McMillian | 2/21 |
| 1,160,522 | 11/1915 | Morris . | |
| 1,257,846 | 2/1918 | Gregory . | |
| 2,129,496 | 9/1938 | Hollingsworth | 2/21 |
| 2,717,799 | 9/1955 | Jones | 2/21 |
| 3,132,648 | 5/1964 | Scholl . | |
| 3,191,824 | 6/1965 | Burr | 2/21 |
| 3,228,033 | 1/1966 | Ames et al. | 2/21 |

*Primary Examiner*—C. D. Crowder
*Assistant Examiner*—Larry D. Worrell, Jr.
*Attorney, Agent, or Firm*—Harness, Dickey & Pierce, P.L.C.

[57] ABSTRACT

A finger-tip protection device for absorbing mechanical shock transferred to the finger-tip as a result of repetitive contact with a hard surface. The device includes a rigid shell having a cavity into which a finger-tip can to be inserted into it. The fore end of the shell is provided with a shock absorbing mechanism located so as to at least partially protrude from the shell in the direction of the intended contact surface. The contact surface is covered with resilient nubs functioning as a portion of the shock absorbing mechanism. In this manner, the shock transferred through the contact surface is attenuated by the shock absorbing mechanism so as to diminish the fatigue and soreness effects caused by repetitive striking of the finger-tip against a hard surface.

14 Claims, 1 Drawing Sheet

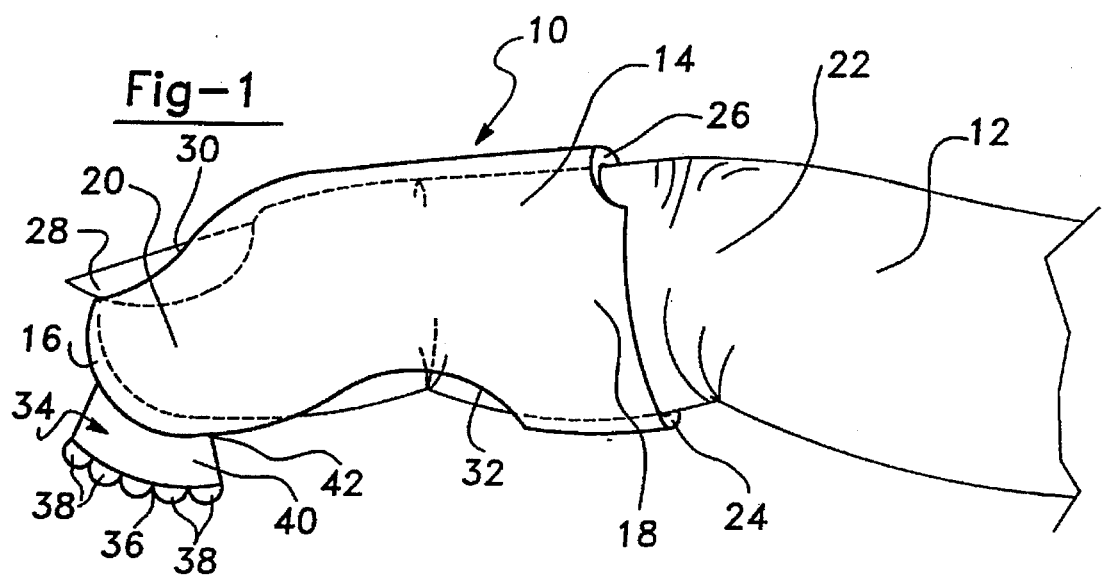
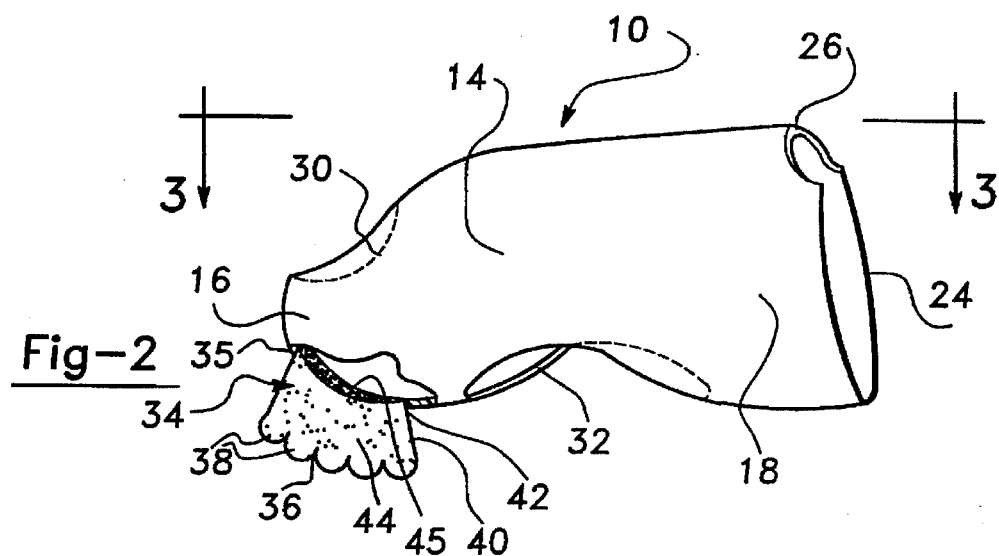
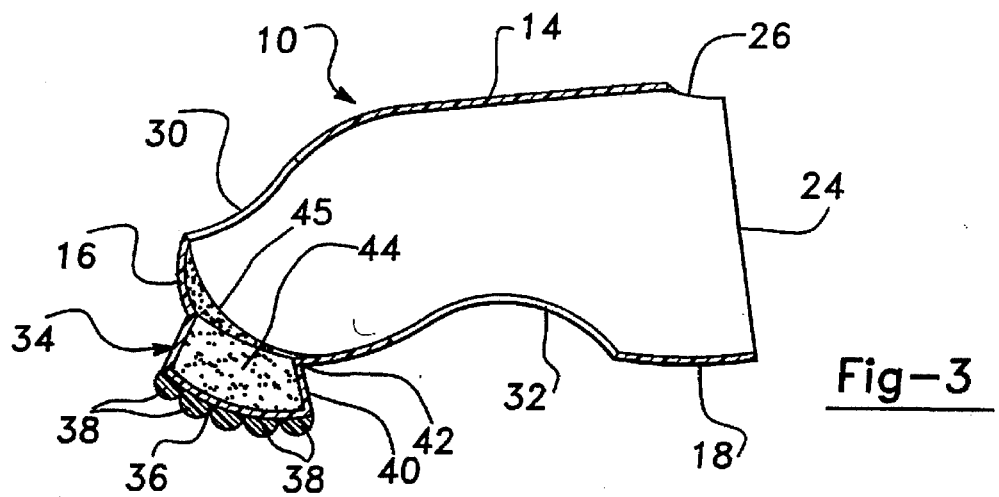

SHOCK ABSORBING FINGER-TIP PROTECTOR

BACKGROUND OF THE INVENTION

1. Field of the Invention

The present invention generally relates to a shock absorbing finger-tip protector. More specifically, the present invention relates to a finger-tip protector which is designed to alleviate the fatigue and soreness generally associated with the repetitive striking of a finger against a hard surface, such as the contact pad of a video slot machine.

2. Description of the Prior Art

Slot machine tournaments have experienced increased popularity at the various gambling venues around the country. During these tournaments, the participants play video slot machines for long durations of time. Unlike prior slot machines where a lever or arm was pulled down to initiate play, with the video slot machine a touch pad, rather than a lever, is employed. Specifically, a hard contact pad is tapped with the player's finger. It has been noted that during these tournaments, both young and old players often complained about soreness developing in their fingers and particularly in the finger used to tap the contact pad of the video slot machine.

Numerous devices have been developed to protect a finger or toe from injury. Other devices have been developed to protect injured digits, to promote healing and to prevent further discomfort of the individual. None of these devices, however, have been specifically designed to ward against the repetitive striking of finger against a hard contact surface as is typically encountered when playing a video slot machine over an extended period of time.

Of the two general categories of prior devices mentioned above, U.S. Pat. Nos. 617,929; 1,160,522 and 2,129,496 all disclose finger-tip protectors which can be generally referred to as shields. In other words, these devices prevent the inadvertent pricking, chaffing or scraping of the finger. U.S. Pat. Nos. 1,257,846 and 3,132,648 both disclose shock absorption in order to protect the finger-tip or digit from discomfort resulting from contact with an object.

In view of the foregoing limitations and shortcomings of the prior art devices, as well as other disadvantages not specifically mentioned above, it should be apparent that there still exists a need in the art for an improved finger-tip protector.

It is therefore a primary object of this invention to fulfill that need by providing a finger-tip protector which absorbs mechanical shock and prevents injury and soreness to the finger-tip as a result of repetitive contact. It is also an object of this invention to provide a finger-tip protector which will absorb mechanical shock in a specific contact area of the device.

Another object of this invention is to provide a finger-tip protector which additionally enables a person to use the protector in picking up a coin.

A further object of this invention is to provide a finger-tip protector which can be worn by individuals having long fingernails.

Still another object of this invention is to provide a finger-tip protector which permits a user to maintain a sense of touch with the finger even though the finger-tip protector of the present invention is being worn over that finger.

SUMMARY OF THE INVENTION

Briefly described, these and other objects are accomplished according to the present invention by providing a finger-tip protector which absorbs mechanical shock being transferred to the finger-tip of a person as a result of repetitive contact with a hard surface.

The finger-tip protector of the present invention includes an exterior shell into which the distal end of a finger can be inserted. The corresponding distal end of the shell is provided with a shock absorbing portion, specifically located adjacent to a defined contact striking surface of the protector. Any shock which is encountered as a result of striking the striking surface of the protector against a hard surface, is attenuated by the shock absorbing mechanism. As a result, the fatigue and damaging effects caused by the repetitive striking of the finger-tip are diminished or alleviated.

In providing the finger-tip protector of the present invention, the protector includes an exterior shell which is generally formed into a shape conforming with the end of a person's forefinger. The shell therefore includes a proximal end, a distal end, and side walls, all of which cooperate to define an internal cavity. The distal end of the protector corresponds with the distal end of the inserted finger and a specific contact protrusion or surface is defined on a lower side of this end. The proximal end of the protector defines an insertion opening which readily permits the insertion of a finger into the cavity of the shell.

Located in the distal end of the protector is a cushioning mechanism. The cushioning mechanism is designed to specifically absorb the mechanical shock which is transmitted from the contact area through the protector and generally to the tip of the user's finger. The cushioning mechanism is located so that it fills the contact protuberance and a portion of the distal end of the protector. Accordingly, the cushioning portion of the device is generally confined to the distal end.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a perspective view of a protector embodying the principles of the present invention illustrating the protector being worn on a person's finger;

FIG. 2 is a perspective view of the protector of FIG. 1, removed from the person's finger; and FIG. 3 is a sectional view taken substantially along line 3—3 in FIG. 2 illustrating the various features of the present invention.

DETAILED DESCRIPTION OF THE PREFERRED EMBODIMENT

Referring now in detail to the drawings, there is shown in FIG. 1 a finger-tip protector (hereinafter just "protector") embodying the principles of the present invention and being generally designated at 10. As shown in FIG. 1, the protector 10 is properly located on the distal end of a person's finger, which is designated at 12, and includes a shell 14 which generally conforms to the shape of the distal end of the finger 12.

The shell 14 includes a distal end 16 and a proximal end 18. When positioned on the finger 12, the distal end 16 corresponds with the distal end 20 of the finger and the proximal end 18 of the protector 10 is located adjacent to the second knuckle 22 of the finger. To permit insertion of the finger 12 into the protector 10, the distal end 18 defines an opening 24 through which the distal end 20 of the finger can be inserted. As best seen in FIG. 2, the upper portion of the opening 24 includes a cut-out 26 which enlarges the effective size of the opening 24 making it easier of a person to insert their finger.

The upper portion of the distal end 16 of the shell 14 is also provided with a cut-out 30. This cut-out 30 at the distal end 16 of the shell 14 is intended to allow the protector 10 of the present invention to be worn by a person having a fingernail 28 which extends beyond the distal end 20 of their finger 12. Accordingly, when such a person's finger 12 is inserted into the protector 10, the location of the cut-out 30 permits the person's fingernail 28 to extend through the cut-out 30.

Formed in the lower surface of the shell 14 is a third cut-out 32. This cut-out 32 is located approximately midway between the distal and proximal ends 16 and 18. Located as such, the cut-out 32 provides an area in the protector 10 through which a person's sense of touch is not diminished. In this way, a person wearing the protector 10 will be able to specifically feel coins and other objects with the finger 12 on which the protector 10 is being worn. This enhances the comfort and familiarity of the protector 10 to the wearer since it eliminates the loss of touch generally associated with the covering of a person's fingers.

Also located on the lower side of the protector 10 adjacent to the distal end 16, is a protuberance or projection 34. The protuberance 34 extends outward from the distal end 16 of the shell and generally away from the distal end 20 of the person's finger 12. The location of the protuberance is intended to coincide with that portion of a person's finger 12 which is most often used in the depressing the contact pad of the video slot machine or another object. Thus, when using the protector 10, the protuberance 34 is used to engage the contact pad.

Two embodiments of the protuberances 34 are illustrated in FIGS. 2 and 3. In FIG. 2, the protuberance 34 is constructed from a resilient material and fitted so as to be retained in an opening 35 in the lower distal end 16 of the shell 14, between cutouts 30 and 32. In the alternative embodiment, the protuberance 34 is unitarily formed as part of the shell 14 and is open to the interior of the shell 14.

In either embodiment, the actual shape of the protuberance 34 can be square, round or otherwise. The rearward portion of the protuberance 34 forms an upstanding wall 40 which faces in the direction of the proximal end 18 of the protector 10. This wall forms a generally arcuate angle with the immediately adjacent portion of the shell 14 and defines a catch 42. The catch 42 readily permits a person using the protector 10 to grasp the edge of a coin (not shown) and lift the coin while wearing the protector 10.

To enhance the use of the protuberance 34 in contacting various items, a contact face 36 of the protuberance 34 is covered with a series of projections or nubs 38. In the embodiment of FIG. 2, the nubs 38 can be unitarily formed with the protuberance 34. Alternatively, as shown in the embodiment of FIG. 3, the nubs 38 are adhesively or otherwise secured to the protuberance 34. In both embodiments, the material, as further described below, used for the nubs 38 assists in decreasing the amount of mechanical shock that is transferred to the finger 12 during impact of the protector 10 and protuberance 34 with a contact pad or other hard surface.

As seen in FIG. 3, the entire protuberance 34, including the nubs 38, is constructed of a resilient material 44 capable of absorbing mechanical shock being transmitted through the protector 10. In the interior of the protuberance 34 is substantially completely filled with the shock absorbing material 44. The shock absorbing material 44 extends inwardly in the shell 44 beyond the immediate area of the protuberance 34. For increased comfort, the material 44 can be provided with an interior flange 45 that will smoothly merges with the interior surface of the distal end 16, generally terminating near the cut-out 30 and smoothly curving back toward the cut-out 32. This providing a smooth resting surface area for the distal end 20 of the person's finger 12 and prevents an uncomfortable transition area between the rigid shell 14 and the material 44. The flange 45 is of the same material 44 as the protuberance 34. The material 44 can be any of numerous different materials such as closed cell foam, open cell foam or any other material which will aid in attenuating the transmission of shock to the distal end 20 of the person's finger 12. Additionally, with respect to the embodiment of FIG. 3, the material 44 can differ from that forming the nubs 38 or can be the same.

From the above, it can be seen that the preferred embodiment of the protector 10 uses a combination of two mechanisms in order to attenuate mechanical shock transferred to a person's finger 12 during striking of a contact pad. These include the nubs 38 and the shock absorbing material 44, the former being located on an exterior surface of the projecting portion of the protector 10 and the latter comprising the interior of the projection or protuberance 34.

While the above description constitutes the preferred embodiment of the present invention, it will be appreciated that the invention is susceptible to modification, variation and change without departing from the proper scope and fair meaning of the accompanying claims.

I claim:

1. A protective article to be worn on the tip of a finger to protect the finger-tip from the fatigue and soreness related to repetitive contact of the finger-tip with a hard surface, said article comprising:

an exterior shell generally formed into a shape of an end of a finger, said shell having a proximal end, a distal end, and side walls defining an internal cavity, said proximal end including portions defining an opening adapted to permit insertion of a finger-tip into said internal cavity of said shell;

a protuberance extending outward therefrom and defining a contact surface on a lower portion of said protector adjacent said distal end; and cushioning means including a resilient shock absorbing material for absorbing shock transmitted through said protuberance to the tip of the finger when said article is struck against a hard surface, said cushioning means lining at least a portion of said interior cavity of said shell adjacent to said distal end of said shell and over said protuberance.

2. An article as set forth in claim 1 wherein said protuberance is unitarily formed with said shell.

3. An article as set forth in claim 2 wherein said protuberance include an interior cavity and at least a portion of said cushioning means is located within said interior cavity.

4. A protective article to be worn on the tip of a finger to protect the finger-tip from the fatigue and soreness related to repetitive contact on the finger-tip with a hard surface, said article comprising:

an exterior shell generally formed into the shape of an end of a finger, said shell having a proximal end, a distal end, and side walls defining an internal cavity, said proximal end including portions defining an opening adapted to permit insertion of a finger-tip into said internal cavity of said shell;

a protuberance unitarily formed with said shell and extending outward therefrom to define a contact surface on a lower portion of said shell adjacent said distal end, said protuberance defining a contact face having nubs located thereon; and cushioning means including a resilient shock absorbing material for absorbing shock transmitted through said protuberance to the tip of the finger when said article is struck against a hard surface, said nubs forming at least a portion of said cushioning means.

5. An article as set forth in claim 4 wherein said protuberance includes an interior cavity and another portion of said cushioning means is located within said interior cavity.

6. An article as set forth in claim 1 wherein said protuberance is made of said resilient absorbing material.

7. An article as set forth in claim 1 wherein said protuberance is attached to said shell through an aperture.

8. A protective article to be worn on the tip of a finger to protect the finger-tip from the fatigue and soreness related to repetitive contact on the finger-tip with a hard surface, said article comprising:

an exterior shell generally formed into the shape of an end of a finger, said shell having a proximal end, a distal end, and side walls defining an internal cavity, said proximal end including portions defining an opening adapted to permit insertion of a finger-tip into said internal cavity of said shell; and a protuberance separately formed from said shell and being attached thereto, said protuberance extending outward from said shell and defining a contact surface on a lower portion of said shell adjacent said distal end, said protuberance having nubs on said contact face; and cushioning means including a resilient shock absorbing material for absorbing shock transmitted through said protuberance to the tip of the finger when said article is struck against a hard surface, said nubs forming at least a portion of said cushioning means.

9. An article as set forth in claim 8 wherein said nubs are unitarily formed with said protuberance.

10. An article as set forth in claim 1 wherein said protuberance cooperates with said shell to define a catch therebetween, said catch generally facing said proximal end and being adapted to engage an edge of a coin to assist in picking up the coin.

11. An article as set forth in claim 1 wherein said shell is semi-rigid.

12. An article as set forth in claim 1 wherein said shell is rigid.

13. An article as set forth in claim 1 further comprising portions of said shell defining an opening in an upper surface of said distal end, said opening adapted to permit a fingernail to extend therethrough.

14. An article as set forth in claim 1 further comprising portions of said shell defining an opening generally in a lower surface between said proximal and distal ends, said opening adapted to permit a surface portion of said finger to protrude therethrough and provide a sense of touch to said finger while wearing said device.

* * * * *